United States Patent
Standke et al.

(10) Patent No.: US 6,255,513 B1
(45) Date of Patent: Jul. 3, 2001

(54) STABLE COMPOSITIONS OF WATER-SOLUBLE AMINO-AND ALKENYL-FUNCTIONAL ORGANOSILOXANES, PROCESS FOR THEIR PREPARATION AND THEIR USE

(75) Inventors: Burkhard Standke, Lörrach; Jaroslaw Monkiewicz; Albert-Johannes Frings, both of Rheinfelden; Ralf Laven, Schwörstadt; Roland Edelmann, Wehr; Peter Jenkner, Rheinfelden; Helmut Mack, Rheinfelden; Dieter Barfurth, Rheinfelden; Michael Horn, Rheinfelden, all of (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/300,448

(22) Filed: Apr. 28, 1999

(30) Foreign Application Priority Data

Apr. 28, 1998 (DE) ............................................. 198 18 923

(51) Int. Cl.$^7$ ....................................................... C07F 7/10
(52) U.S. Cl. .......................... 556/425; 556/413; 523/200; 428/405; 427/445
(58) Field of Search ................................ 556/413, 425; 523/200; 428/405; 427/445

(56) References Cited

U.S. PATENT DOCUMENTS 5,885,341   3/1999   Standke et al. .

FOREIGN PATENT DOCUMENTS

| 196 39 782 | 4/1998 | (DE) . |
|---|---|---|
| 0 675 128 | 10/1995 | (EP) . |
| 0 716 127 | 6/1996 | (EP) . |
| 0716 128 | 6/1996 | (EP) . |
| 0 832 911 A1 | 7/1997 | (EP) . |

*Primary Examiner*—Paul F. Shaver
(74) *Attorney, Agent, or Firm*—Oblon, Spivak, McClelland, Maier & Neustadt, P.C.

(57) ABSTRACT

The present invention relates to a stable composition of water-soluble organosiloxanes obtained by reacting a) a water-soluble amino-functional alkoxysilane with at least one water-insoluble alkenyl-functional alkoxysilane b) by adding water to form a mixture, and c) removing the alcohol formed during step b) from the mixture, where the amino-functional alkoxysilane and the water are used in the reaction at least in amounts such that substantially all of the alkoxy groups of the water-insoluble silane can react and such that when a resulting composition is diluted with water, essentially no alcohol is liberated by hydrolysis, and the composition, during an/or after the reaction, has a pH of from 2 to 6, the pH being preferably adjusted by adding an organic or inorganic, optionally aqueous, acid. In addition, the present invention discloses a process for the preparation of such a composition and also its use.

23 Claims, No Drawings

STABLE COMPOSITIONS OF WATER-SOLUBLE AMINO-AND ALKENYL-FUNCTIONAL ORGANOSILOXANES, PROCESS FOR THEIR PREPARATION AND THEIR USE

BACKGROUND OF THE INVENTION

1. Field of the Invention

The present invention relates to a stable composition of water-soluble organosiloxanes obtained by a) reacting a water-soluble amino-functional alkoxysilane with at least one water-insoluble alkoxysilane b) by adding water and, optionally, an organic or inorganic acid, to form a mixture, and c) removing the alcohol formed during step b) from the mixture, wherein the amino-functional alkoxysilane and the water are present in the reaction at least in amounts such that all of the alkoxy groups of the water-insoluble silane can react and such that when the resulting composition is diluted with water, essentially no alcohol is liberated by hydrolysis, and also to a process for its preparation and to its use.

2. Discussion of the Background

Compositions of water-based organopolysiloxanes usually contain completely hydrolyzed and oligomerized units: the alkoxy groups of the organoalkoxysilanes used in the synthesis being virtually completely substituted by OH groups. Such water-based organopolysiloxane-containing systems becoming widely used since they are essentially free from solvents and they liberate virtually no alcohols by hydrolysis even when diluted with water and upon application. EP-A 0 716 127 and EP-A 0 716 128 discloses water-based organopolysiloxane-containing compositions which are prepared by hydrolytically oligomerizing a "carrier silane", a water-soluble aminoalkoxysilane and water-insoluble alkylalkoxysilanes and ureidoalkoxysilanes in a pH ranging from 1 to 11, and removing most of the alcohol formed in the reaction from the reaction mixture.

The above compositions are usually clear liquids having a long shelf life and a flash point of more than 70° C., and they are widely used, inter alia for improving the rheological properties of polymer dispersions and emulsions and for silanizing surfaces. However, adjusting the rheological properties and modifying surface properties requires an agent specifically matched to the product to be modified. Thus, the as yet unpublished German patent application No. 196 39 782.0 discloses water-based amino-, glycidyl ether-, acrylic- and methacrylic-functional organopolysiloxane-containing compositions.

In addition, EP 0 675 128 A1 discloses a process for the preparation of a stable composition of water-soluble organosiloxanes which includes reacting a water-soluble amino-functional alkoxysilane with a water insoluble vinyl-functional alkoxysilane with the addition of water, and removing the alcohol formed in this reaction from the mixture, wherein the aminofunctional alkoxysilane and the water are used in the reaction in amounts such that all of the alkoxy groups of the water-insoluble silane can react, so that when the resulting composition is diluted with water, essentially no alcohol is liberated by hydrolysis.

Such compositions of water-soluble organosiloxanes are used commercially, inter alia as adhesion promoters in compounds, and fillers and pigments are silanized in mostly complex processes. It is frequently necessary, however, to dry surface-modified fillers on a tray and then to comminute them again by energy-intensive measures. The use of spray-drying as a alternative for tray-drying requires a pumpable composition, and it is frequently necessary to add large amounts of processing auxiliaries to adjust the rheology.

SUMMARY OF THE INVENTION

The object of the present invention is to prepare a stable composition of water-soluble organosiloxanes. A particular aim of the invention is to use such compositions in an advantageous manner in the silanization of fillers and pigments.

These and other objects have been achieved by the present invention.

The first embodiment of the present invention relates to a stable water-soluble organosiloxane composition that includes the reaction product of a process including reacting a) a water-soluble amino-functional alkoxysilane with at least one water-insoluble alkenyl-functional alkoxysilane b) by adding water and, optionally, adding an organic or inorganic acid, to form a mixture, and c) removing the alcohol formed in the reaction from the mixture, wherein the amino-functional alkoxysilane and the water are present in the reaction at least in amounts wherein substantially all of the alkoxy groups of the water-insoluble alkenyl-functional alkoxysilane react and wherein when the resulting composition is diluted with water, essentially no alcohol is liberated by hydrolysis, and wherein the pH of the composition is from 2 to 6.

The second embodiment of the present invention relates to a process for the preparation of a stable composition of water-soluble organosiloxanes, which includes reacting a) a water-soluble amino-functional alkoxysilane with at least one water-insoluble alkenyl-functional alkoxysilane b) by adding water and, optionally, adding an organic or inorganic acid, to form a mixture, and c) removing the alcohol formed in the reaction from the mixture, wherein the amino-functional alkoxysilane and the water are present in the reaction at least in amounts wherein substantially all of the alkoxy groups of the water-insoluble alkenyl-functional alkoxysilane react and wherein when the resulting composition is diluted with water, essentially no alcohol is liberated by hydrolysis, and wherein the pH of the composition is from 2 to 6.

DESCRIPTION OF THE PREFERRED EMBODIMENTS

A more complete appreciation of the invention and many of the attendant advantages thereof will be readily obtained as the same becomes better understood by reference to the following detailed description, which is not intended to be limiting unless otherwise specified.

Preferably, a stable composition of water-soluble organosiloxanes is obtained by reacting a) a water-soluble amino-functional alkoxysilane, preferably a 3-aminopropyltrialkoxysilane, with at least one water-insoluble alkenyl-functional alkoxysilane, preferably a vinyltrialkoxysilane, b) by adding water to form a mixture, and c) removing the alcohol formed during step b) from the mixture, to wherein the amino-functional alkoxysilane and the water are used in the reaction at least in amounts such that all of the alkoxy groups of the water-insoluble alkenyl-functional silane can react, and wherein the composition has a pH of from 2 to 6, preferably a pH of from 3 to 5, particularly preferably a pH of from 3.5 to 5, very particularly preferably a pH of from 3.5 to 4.5. The pH is preferably adjusted before or during the reaction or both by adding an organic or inorganic optionally aqueous, acid, preferably formic acid, acetic acid, HCl, $HNO_3$ or $H_2SO_4$. The composition is especially useful to improve the processing conditions during the silanization of a filler, in which case a mixture of filler (e.g. aluminum hydroxide), water and the composition of the invention exhibits a significant drop in viscosity while being stirred after just a few minutes, so that the starting paste can be conveyed in a low-viscosity state easily and in a simple and economic manner via a pump, for example to a spray dryer.

Moreover, fillers and pigments which are silanized using the composition of the invention also advantageously have functional properties which are particularly useful in paints, surface coatings, adhesives, sealants, polymer compositions and compounds.

The composition of the invention can be diluted with water as desired. The composition of the invention preferably has a content of organosiloxanes of from 1 to 150 g of Si/kg of the composition, preferably from 60 to 130 g of Si/kg, particularly preferably from 90 to 120 g of Si/kg.

Moreover, it is advantageous that the flash point of the present compositions is also generally above 70° C., the content of alcohol usually being less than 1%, so that the water-based compositions according to the invention can also be used in a particularly advantageous manner. Preference is given to those compositions which contain alcohol, for example methanol or ethanol, in amounts of from 0.3 to 0.1% by weight, particularly preferably less than 0.1% by weight.

In the process of the invention, the amino-functional alkoxysilane used is preferably at least one from the series consisting of 3-aminopropyltrimethoxysilane, 3-aminopropyltriethoxysilane, N-aminoethyl-3-aminopropyltrimethoxysilane, N-aminoethyl-3-aminopropyltriethoxysilane, triaminofunctional propyltrimethoxysilanes, triamino-functional propyltriethoxysilanes, 3-aminopropylmethyldimethoxysilane, 3-aminopropylmethyldiethoxysilane, N-aminoethyl-3-aminopropylmethyldimethoxysilane, N-aminoethyl-3-aminopropylmethyldiethoxysilane, triamino-functional propylmethyldimethoxysilanes and triamino-functional propylmethyldiethoxysilanes, and mixtures thereof.

In addition, in the process of the invention, the alkenyl-functional alkoxysilane used in preferably at least one from the series consisting of vinyltrimethoxysilane, vinyltriethoxysilane, vinyltris(2-methoxyethoxy)silane and vinyltrichlorosilane, and mixtures thereof.

In general, the materials used for the process of the invention may preferably be very pure products up to technical-grade qualities of the preferred alkoxysilanes. Starting materials having a purity of more than 90% are preferably used for the process of the invention.

In general, the process of the invention is preferably carried out by bringing together at least one aminofunctional alkoxysilane, for example 3-aminopropyltriethoxysilane, and at least one alkenyl-functional alkoxysilane, for example vinyltrimethoxysilane, and optionally an acid, for example formic acid, and water, which is advantageously used in a molar ratio to the abovementioned amino-functional alkoxysilane of from 5:1 to 1:1, with very thorough mixing and pH control at a temperature in the range from 10 to 90° C., and allowing the mixture to react and removing the alcohol formed from the system, optionally under reduced pressure, it being possible to replace the quantities of alcohol drawn off in this way to the same extent by water, which is optionally acidified. The acid may be an organic or inorganic acid and is advantageously added during and/or after the reaction, so that the product has a pH in the range from 2 to 6.

In this connection, a monobasic acid, for example formic acid, acetic acid, HCl or $HNO_3$, is suitably used. The resultant clear composition of water-soluble organosiloxane is generally stable over a period of up to 6 months and even longer. In accordance with general chemical understanding, the inventors believe that the organosiloxanes present in the composition have a degree of oligomerization between 2 and 100, a functional group being bonded to each silicon in the organosiloxane and the molar ratio of the functional aminoalkyl and alkenyl groups present in the organosiloxane preferably being from 5:1 to 1:1, particularly preferably from 3:1 to 1:1. The mean degree of oligomerization of said organosiloxanes in a novel composition is preferably from 2 to 50, particularly advantageously from 2 to 20, very particularly advantageously from 3 to 20.

The composition of the present invention is preferably used in the silanization of predominantly mineral surfaces, in particular of fillers and pigments, thus, for example, for aluminum oxides, aluminum hydroxides, magnesium oxide, magnesium hydroxides, for example brucite, pyrogenic or precipitated silica, titanium dioxide, carbonates such as chalk, calcium sulfate and barium sulfate, silicates such as talc, kaolin, mica, for example muscovite, wollastonite, glass fibers, glass beads and carbon black and the like. These fillers or pigments, which are advantageously silanized using the composition of the present invention can be used, for example, in adhesives, sealants, polymer compositions and compounds, paints and surface coatings.

A method for the silanization of surfaces with the composition of the present invention, in particular for the modification of pigments and fillers, is thus also provided by the invention.

In the silanization of fillers, for example in the case of aluminum hydroxide, as well as modifying the properties, the composition of the invention has a clearly advantageous effect. In the process for the silanization of fillers and pigments, a paste of a silanized pigment or filler can be obtained with the addition of comparatively small amounts of the composition of the present invention and an associated simultaneous decrease in the viscosity in a simple and economic manner, for example for advantageous further processing by spray drying.

Investigations in which 1% by weight, based on the solids content of the paste, of the composition of the invention is added to a 60% chalk paste also show a very large decrease in viscosity to less than 6% of the initial velocity. Moreover, it has been found that the filtered silanized product dried at 110° C. can be very readily suspended, for example, in pentane while untreated chalk forms lumps.

The composition of the present invention is thus preferably also used in advantageous manner for the preparation of silanized fillers or pigments which effect a reduction in the viscosity of the filler- or pigment-containing preparations or an improvement in the suspendability of said fillers or pigments in solvents.

EXAMPLES

Having generally described this invention, a further understanding can be obtained by reference to certain specific examples which are provided herein for purposes of illustration only and are not intended to be limiting unless otherwise specified.

Comparative Example A

Preparation of a water-soluble cohydrolyzate from 3-aminopropyltriethoxysilane (AMEO) and vinyltrimethoxysilane (VTMO): 297.6 g (1.346 mol) of AMEO and 79.4 9 (0.536 mol) of VTMO are introduced initially into a stirred reactor fitted with distillation apparatus. 600.0 g of deionized water are metered in using metering means over the course of one hour. During this time the temperature increases to about 40° C. The reaction mixture is stirred for 2 hours at 60° C., after which an alcohol/water mixture is distilled off under reduced pressure and simultaneously replaced by water (pressure: 250 to 133 mbar; T (still): 50° C.). When the head temperature is about 50° C. and the top product only comprises water, distillation is stopped.

The resulting composition usually has a pH between 10 and 11 and an alcohol content of less than 0.1% by weight and has a shelf life of about 6 months.

Example 1

Preparation of a water-soluble cohydrolyzate of 3-aminopropyltriethoxysilane (AMEO) and vinyltrimethoxysilane (VTMO): 442.2 9 (2.0 mol) of AMEO and 296.2 9 (2.0 mol) of VTMO are introduced initially into a stirred reactor fitted with distillation apparatus. 144.0 g of water (2.0 mol/mol of Si) are metered in via metering means over the course of 10 minutes. During this time, the temperature increases from room temperature to about 60° C. The mixture is stirred for one hour, after which 119.1 g of 85% strength formic acid (1:1 mol/mol of AMEO) are added over the course of one hour. The temperature then increases to about 65° C. The hydrolysis alcohol is distilled off under reduced pressure and simultaneously replaced by water (pressure: 250 to 133 mbar, T (still): 42 to 53° C.). When the head temperature is about 50° C. and the top product only comprises water, distillation is stopped and the weight of the product is adjusted to 923.0 g using water.

The resulting composition has a pH between 4 and 5 and an alcohol content of less than 0.1% by weight and, in a particularly advantageous manner, has a shelf life of 12 months

Comparative Example B 500 g of aluminum hydroxide, abbreviated to ATH below, (Martinal® OL-107) and 500 g of deionized water are thoroughly mixed to a paste using a high-speed stirrer, 1% by weight of the product from Comparative Example A, based on ATH, is added in portions with stirring, and the viscosity is measured in each case after a period of 3 minutes using a Brookfield viscometer (rotation viscometer RVT, spindle 5/6), cf Table 1.

Example 2

Comparative Example B is repeated in a suitable manner using the product from Example 1, cf Table 1.

The comparison shows that the viscosity of the starting ATH paste can be reduced in a very effective and clear way using just comparatively small amounts of the novel product from Example 1 compared with the product from Comparative Example A.

TABLE 1

Viscosity titration for ATH (50% slurry in water) containing product from Example 1 or Comparative Example A

| Amount of product from Example 1 added (% calculated on ATH) | Measured viscosities after stirring for 3 min (mPa s) | Spindle speed (rpm) | Amount of product from Comparative Example A added (% calculated on ATH) | Measured viscosities after stirring for 3 min (mPa s) | Spindle speed (rpm) |
|---|---|---|---|---|---|
| 0.0 | 95,000 | 10 | 0.0 | 95,000 | 10 |
| 0.5 | 14,000 | 10 | 2.0 | 25,000 | 10 |
| 0.75 | 10,000 | 10 | 4.0 | 19,000 | 10 |
| 1.0 | 1400 | 10 | 6.0 | 15,000 | 10 |
| 1.25 | 150 | 10 | 8.0 | 14,000 | 10 |

Comparative Example C

Comparative Example B is repeated in a suitable manner using chalk (OMYALITE® 50), cf. Table 2.

Example 3

Comparative Example C is repeated in a suitable manner using product from Example 1, cf. Table 2.

Similarly, there is a significant decrease in viscosity after just a few minutes. The starting chalk paste is of low viscosity even after the addition of comparatively small amounts of product from Example 1, can be pumped without problem and dried in a bench spray dryer.

TABLE 2

Viscosity titration for chalk (50% slurry in water) containing product from Example 1 or Comparative Example A

| Amount of product from Example 1 added (% calculated on chalk) | Measured viscosities after stirring for 3 min (mPa s) | Spindle speed (rpm) | Amount of product from Comparative Example A added (% calculated on chalk) | Measured viscosities after stirring for 3 min (mPa s) | Spindle speed (rpm) |
|---|---|---|---|---|---|
| 0.0 | 3800 | 10 | 0.0 | 3800 | 10 |
| 0.5 | 2000 | 10 | 1.0 | 2400 | 10 |
| 0.75 | 100 | 10 | 2.0 | 2100 | 10 |
| 1.0 | 100 | 10 | 5.0 | 1500 | 10 |

This application is based on German patent application 198 18 923.0 filed Apr. 28, 1998, the entire contents of which are hereby incorporated by reference.

Having now fully described the invention, it will be apparent to one of ordinary skill in the art that many changes and modifications can be made thereto without departing from the spirit or scope of the invention as set forth herein.

What is claimed is:

1. A stable water-soluble organosiloxane composition, comprising the reaction product of a process comprising reacting:
   a) a water-soluble amino-functional alkoxysilane with at least one water-insoluble alkenyl-functional alkoxysilane
   b) by adding water and, optionally, adding an organic or inorganic acid, to form a mixture, and
   c) removing the alcohol formed in the reaction from the mixture, where the amino-functional alkoxysilane and the water are used in the reaction at least in amounts wherein substantially all of the alkoxy groups of the water-insoluble alkenyl-functional alkoxysilane react and wherein when the resulting composition is diluted with water, essentially no alcohol is liberated by hydrolysis, and wherein the pH of the composition is from 2 to 6.

2. The composition as claimed in claim 1 having a pH of 3 to 5.

3. The composition as claimed in claim 2 having a pH of 3.5 to 4.5.

4. The composition as claimed in claim 1, wherein the pH is adjusted either during or after the reaction or both by adding an organic or inorganic acid.

5. The composition as claimed in claim 1, wherein the organosiloxane is present in an amount of 1 to 150 g of Si/kg of the composition.

6. The composition as claimed in claim 1, wherein a functional group is bonded to each silicon in the organosiloxane.

7. The composition as claimed in claim 1, wherein the ratio of the amino-functional alkyl groups and alkenyl-functional groups present in the organosiloxane ranges from 5:1 to 1:1.

8. The composition as claimed in claim 1, wherein the mean degree of oligomerization of the organosiloxane is between 2 and 100.

9. The composition as claimed in claim 1, wherein the organosiloxane composition comprises alcohol in an amount of 0.05 to 1% by weight.

10. The composition as claimed in claim 1, wherein the flash point of the composition is above 70° C.

11. A process for the preparation of a stable composition of water-soluble organosiloxanes, comprising reacting a) a water-soluble amino-functional alkoxysilane with at least one water-insoluble alkenyl-functional alkoxysilane b) by adding water and, optionally, adding an organic or inorganic acid, to form a mixture, and c) removing the alcohol formed in the reaction from the mixture, where the amino-functional alkoxysilane and the water being are present in the reaction at least in amounts wherein substantially all of the alkoxy groups of the water-insoluble alkenyl-functional alkoxysilane react and wherein when the resulting composition is diluted with water, essentially no alcohol is liberated by hydrolysis, and wherein the pH of the composition is from 2 to 6.

12. The composition as claimed in claim 4, wherein said organic or inorganic acid is aqueous-based.

13. The process as claimed in claim 11, wherein the alkenylfunctional alkoxysilane is selected from the group consisting of vinyltrimethoxysilane, vinyltriethoxysilane, vinyltris(3-methoxyethoxy)silane and vinyltrichlorosilane.

14. The process as claimed in claim 11, further comprising mixing the composition A stable water-soluble organosiloxane composition, comprising the reaction product of a process comprising reacting:

a) a water-soluble amino-functional alkoxysilane with at least one water-insoluble alkenyl-functional alkoxysilane b) by adding water and, optionally, adding an organic or inorganic acid, to form a mixture, and c) removing the alcohol formed in the reaction from the mixture, where the amino-functional alkoxysilane and the water are used in the reaction at least in amounts wherein substantially all of the alkoxy groups of the water-insoluble alkenyl-functional alkoxysilane react and wherein when the resulting composition is diluted with water, essentially no alcohol is liberated by hydrolysis, and wherein the pH of the composition is from 2 to 6.

15. The process as claimed in claim 11, wherein the ratio of the amino-functional alkyl groups and alkenyl-functional groups present in the organosiloxane ranges from 5:1 to 1:1.

16. A surface modified filler or pigment, comprising a surface that is modified with the composition of claim 1.

17. A method for reducing the viscosity of filler or pigment compositions, comprising mixing a filler or pigment with the composition of claim 1.

18. A method for improving the suspendability of fillers or pigments in solvents, comprising mixing a filler or pigment with the composition of claim 1.

19. The composition as claimed in claim 4, wherein said aqueous-based organic acid is formic acid or acetic acid.

20. The composition as claimed in claim 12, wherein said aqueous-based inorganic acid is HCl, $HNO_3$ or $H_2SO_4$.

21. The composition as claimed in claim 1, wherein said water-soluble amino-functional alkoxysilane is selected from the group consisting of 3-aminopropyltrimethoxysilane, 3-aminopropyltriethoxysilane, N-aminoethyl-3-aminopropyltrimethoxysilane, N-aminoethyl-3-aminopropyltriethoxysilane, triamino-functional propyltrimethoxysilanes, triamino-functional propyltriethoxysilanes, 3-amino propylmethyldimethoxysilane, 3-aminopropylmethyldiethoxysilane, N-aminoethyl-3-aminopropylmethyldimethoxysilane, N-aminoethyl-3-aminopropylmethyldiethoxysilane, triamino-functional propylmethyldimethoxysilanes and triamino-functional propylmethyldiethoxysilanes.

22. The composition as claimed in claim 1, wherein said water-insoluble alkenyl functional alkoxysilane is selected from the group consisting of vinyltrimethoxysilane, vinyltriethoxysilane, vinyltris(2-methoxyethoxy)silane and vinyltrichlorosilane.

23. The process as claimed in claim 11, wherein said water-soluble amino-functional alkoxysilane is selected from the group consisting of 3-aminopropyltrimethoxysilane, 3-aminopropylmethyldiethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, triamino-functional propyltrimethoxysilanes, triamino-functional propylmethyldimethoxysilanes, triamino-functional propyltriethoxysilanes and triamino-functional propylmethyldiethoxysilanes and mixtures thereof.

* * * * *